(12) United States Patent
Fukuoka

(10) Patent No.: US 7,625,083 B2
(45) Date of Patent: Dec. 1, 2009

(54) SPRING HINGE STRUCTURE FOR EYEWEAR

(75) Inventor: Hiroshi Fukuoka, Sabae (JP)

(73) Assignee: Eurovision Co., Ltd., Sabae-Shi, Fukui (JP)

( * ) Notice: Subject to any disclaimer, the term of this patent is extended or adjusted under 35 U.S.C. 154(b) by 0 days.

(21) Appl. No.: 12/153,924

(22) Filed: May 28, 2008

(65) Prior Publication Data

US 2008/0297717 A1    Dec. 4, 2008

(30) Foreign Application Priority Data

Jun. 4, 2007    (JP) ............................. 2007-173403

(51) Int. Cl.
*G02C 5/22* (2006.01)

(52) U.S. Cl. .......................................... 351/153; 16/228

(58) Field of Classification Search ................. 351/113, 351/114, 118, 121, 153, 111, 119; 16/228
See application file for complete search history.

(56) References Cited

U.S. PATENT DOCUMENTS

| | | | |
|---|---|---|---|
| 3,567,315 A | 3/1971 | Speer | |
| 4,351,086 A * | 9/1982 | Drlik | 16/228 |
| 4,448,502 A * | 5/1984 | Tota | 351/153 |
| 4,818,093 A | 4/1989 | Tabacchi | |
| 6,283,593 B1 | 9/2001 | Shih | |
| 6,631,194 B2 | 10/2003 | Fukuoka | |
| 2003/0147045 A1 | 8/2003 | Fukuoka | |

FOREIGN PATENT DOCUMENTS

| | | |
|---|---|---|
| FR | 2 206 513 | 6/1974 |
| FR | 2 398 322 | 2/1979 |
| GB | 762321 | 11/1956 |
| WO | WO 2008/010246 | 1/2008 |

\* cited by examiner

*Primary Examiner*—Huy K Mai
(74) *Attorney, Agent, or Firm*—Manabu Kanesaka

(57) ABSTRACT

A spring hinge for an eyewear includes a front frame having an attachment portion and a first articulation hinge element, a temple connected to the front frame and having a hollow housing at an end portion, a cover member with a front bump for covering an outside opening of the temple, and a U-shaped slide member with a second articulation hinge element. The U-shaped slide member is housed in the hollow housing to be slidable along a longitudinal direction of the temple. A compression coil spring is provided between the front bump and the U-shaped member in a compressed state. The temple and the attached portion are rotationally connected at the first and second articulation hinge elements. When the temple is pushed outwardly, the temple is opened from a position perpendicular to the front frame, while the compression coil spring is being compressed.

7 Claims, 10 Drawing Sheets

SPRING HINGE STRUCTURE FOR EYEWEAR

BACKGROUND OF THE INVENTION AND RELATED ART STATEMENT

This invention relates to a spring hinge for an eyewear, which is easily assembled and disassembled, and manufactured at a low cost.

This invention is an improvement of U.S. Pat. No. 6,631, 194 (Patent Document 1). The eyewear according to the prior art patent has been used, but there are some points to be improved. The present invention has been made to improve the problems in the prior art.

In connection with the prior art shown in FIG. 11, the first object of the invention is to eliminate a difficulty of forming a bump 62 integrally within a temple hollow portion. The temple made by the conventional techniques of the prior art takes a lot of time and is very expensive to produce. The temple becomes a defective product or disposed just because a few defects occur at the temple in the course of manufacturing.

The second object of the invention is, in FIG. 12, to eliminate a warp, unsteadiness, and loose fitting occurred due to a fastening screw between both cover members 63, 64.

The third object of the invention is to prevent a surface of an attachment of a front frame of the eyewear from being scratched by a temple end due to rotations.

In addition, recently, since wide and soft material temples become popular, further object of the invention is to adjust the spring hinge to said wide and soft material temple.

Further objects and advantages of the invention will be apparent from the following description of the invention.

SUMMARY OF THE INVENTION

According to an embodiment of the invention, an attachment portion is attached to an end of the front frame of the eyewear, and has first hinge articulation elements at a side of the end of the front frame. A temple includes a housing having a hollow portion with a flat bottom. The hollow portion has a front side opening and an outside opening, and the temple is connected to the attachment portion A cover member, integrally formed with one essential front bump and other optional rear bump having a screw hole, respectably, is attached to the housing so as to close the opening of the outside of the housing. A U-shaped slide member having second hinge articulation elements at a free end is housed in the hollow portion of the housing, and slidably situated along a longitudinal direction of the temple. A compression coil spring is inserted into the housing between the front bump of the cover member and an inner periphery of the U-shaped slide member. A shaft screw is situated in through holes of the first and second hinge articulation elements, and the temple and the attachment portion are rotationally connected to each other. And when the temple is pushed outwardly from the eyewear, the temple is further opened widely, while the compression coil spring being compressed.

In another embodiment of the invention, the attachment portion is attached to the end of the front frame of the eyewear, and has first hinge articulation elements at a side of the end of the front frame. The temple including a housing having a hollow portion with a flat bottom has a front side opening and an outside opening, and the temple is to be connected to the attachment portion. A cover member is integrally formed with one essential front bump and other optional rear bump having a screw hole, respectably. The front bump has a flat front surface thereon, and the flat front surface abuts only to a back surface of an angular formed as a center articulation element of the first hinge articulation elements. A U-shaped slide member with second hinge articulation elements at free ends is housed in the hollow portion of the housing, and slidably situated along a longitudinal direction of the temple. A compression coil spring is inserted into the housing between the front bump of the cover member and an inner periphery of the U-shaped slide member. A shaft screw is provided in holes of the first and second hinge articulation elements so as to rotationally connect the temple to the attachment portion. When the temple is opened from the closed position, the temple is able to be semi automatically opened from a halfway opened position by a resilient reaction of the spring, and when the temple is closed from the opened position, the temple is able to be semi automatically closed from a halfway closed position by the resilient reaction of the spring.

Further, an ornament portion may be formed on an outside face of the cover member.

The temple may have a housing with a hollow portion, said hollow portion having a hexahedral box shape, front and outside openings, and a metal core extending from the end of the box.

A flat bottom of the hexahedral box of the housing extends outwardly like a wing or extension, said wing or extension having at least a pair of projections at an inner wall thereon. The projections of the inner wall of the wing or extension contact a surface of a temple substrate to be fixed tightly. Also the cover member may have a pair of the projections at the inner wall thereon.

In addition, the first articulation hinge elements are arranged to be spaced from a distal end of the temple, so that the first articulation hinge elements are prevented from impairments due to the contact of the distal end of the temple.

DETAILED DESCRIPTION OF THE PREFERRED EMBODIMENTS

Figure 1:
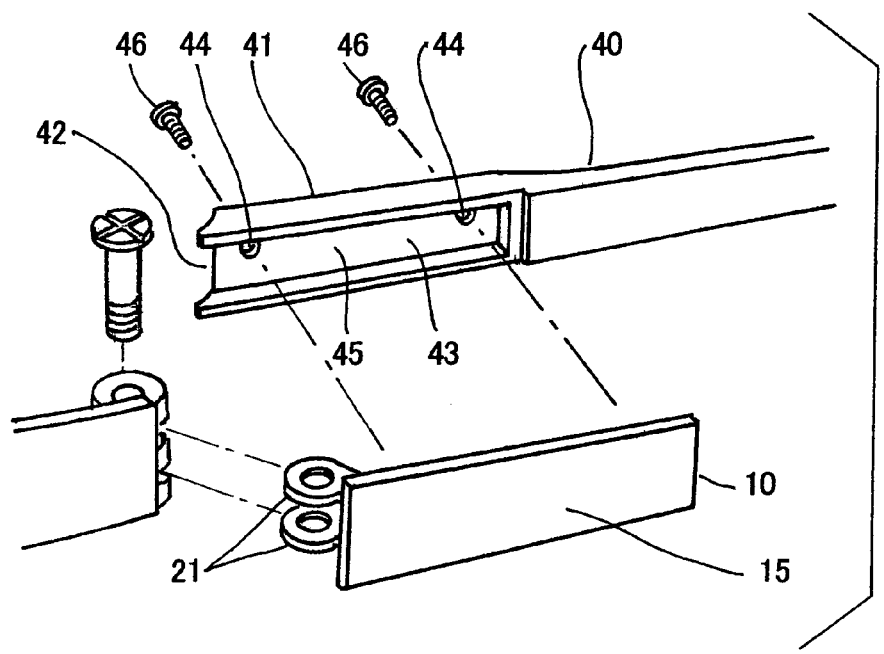
FIG. 1 is an exploded perspective view of a spring hinge of a temple of the first embodiment of the present invention.
Figure 2:
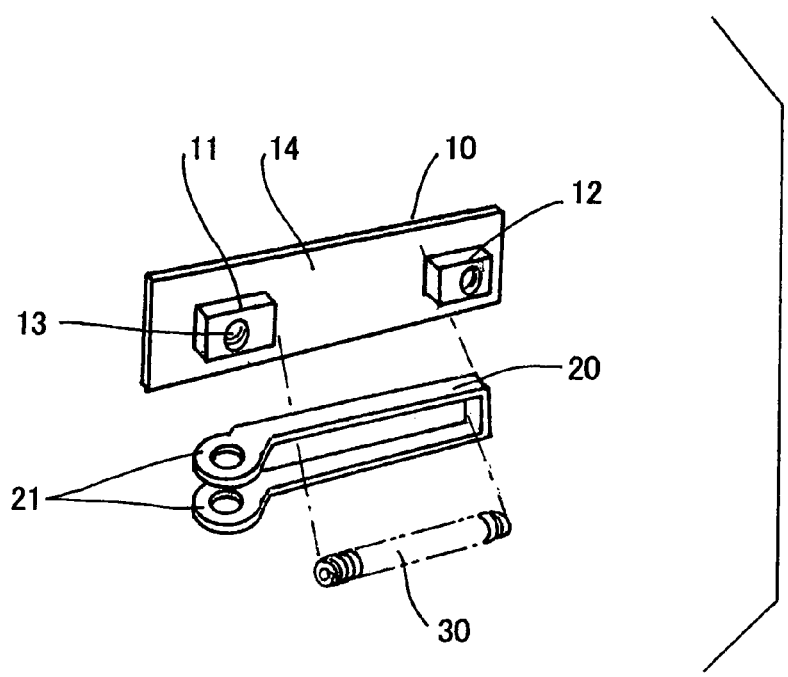
FIG. 2 is an exploded perspective view of the spring hinge of the present invention.
Figure 3:
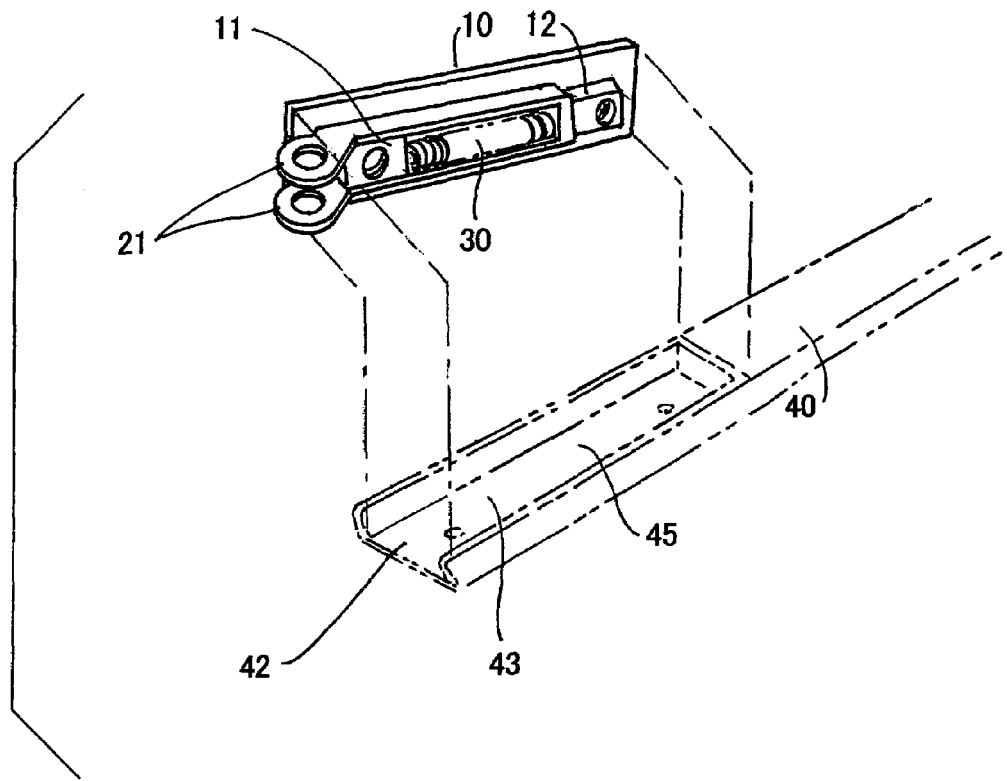
FIG. 3 is an exploded perspective view of the spring hinge of the first embodiment of the invention assembled from the state shown in FIG. 2.

In FIG. 1, on a front side of a temple 40, there is provided a hexahedral housing having a front side opening 42 and an outside opening 43, and remaining four faces form walls. An inner wall of a bottom side face 45 is formed in a flat shape, where through holes 44 are provided for a fastening screw 46. The flat surface of an inner face of the cover member is easily manufactured, compared to the bumped face manufactured in the hollow portion, and is produced at a low cost. In FIG. 2 and FIG. 3, a cover member 10 with an essential front bump 11 and an optional rear bump 12 having a blind hole 13, respectively, for a fastening screw is provided to close the outside opening 43 of the temple by the fastening screw. The cover member and its bump may be integrally formed by means of pressing, machining, or other method, e.g., metal injection molding. The front bump 11 formed on the inner wall 14 of the cover member is adapted to a stopper for a compression coil spring, and the rear bump 12 is adapted to a stopper for a U-shaped slide member.

The U-shaped slide member 20 has a pair of second hinge articulation element 21 at a front free end, which is slidably situated along the longitudinal direction of the temple, and which is tightly engaged to the hollow portion of the temple. The preloading coil spring 30 is interposed between a rear surface of the front bump 11 and an inner periphery of the U-shaped slide member 20.

Next, as shown in FIG. 3, the cover member 10, the U-shaped slide member 20, and the coil spring 30 above mentioned are assembled by the fastening screw. The assembly is inserted into the hollow portion 45 of the temple 40 so as to allow the second hinge articulation elements to protrude from the front side opening 42.

Figure 4:
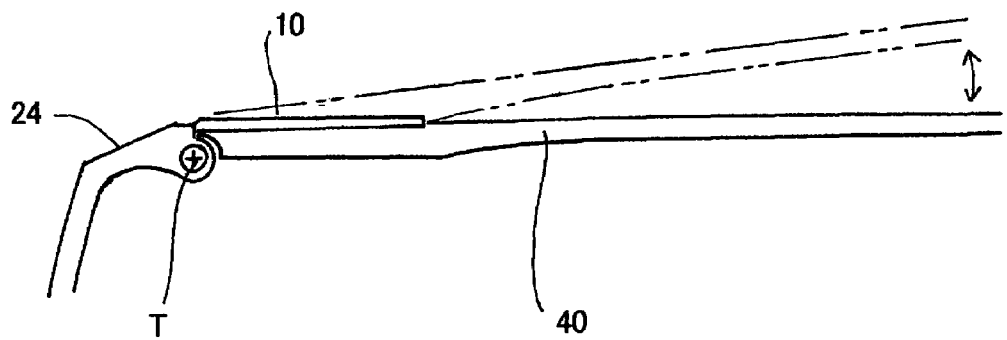
FIG. 4 is a plan view of the spring hinge part of the first embodiment of the invention for explaining the function of the spring hinge.

As shown in FIG. 4, the temple 40, after assembling, is connected to the first hinge articulation elements of the attachment portion 24 by a shaft screw (T).

The cover member thus manufactured can be easily opened, and a defective part in the housing can be easily and immediately repaired or replaced. Furthermore, it is easier to form the bump on the inner wall of the cover member than to form the bump on the inner wall of the hollow portion of the temple, so that the production cost of the eyewear can be reduced.

Figure 5:
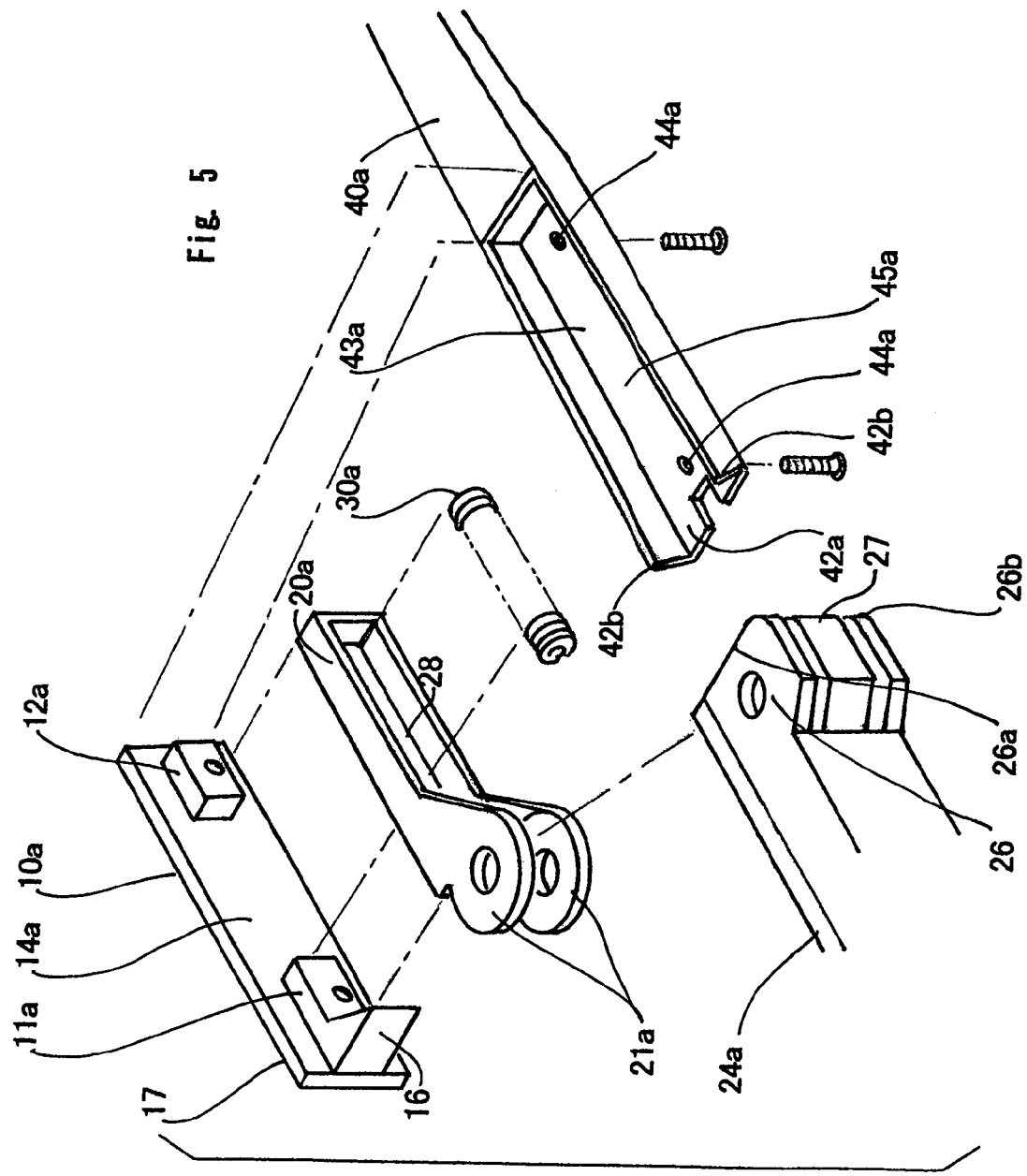
FIG. 5 is an exploded perspective view of the temple of the second embodiment of the invention.
Figure 6:
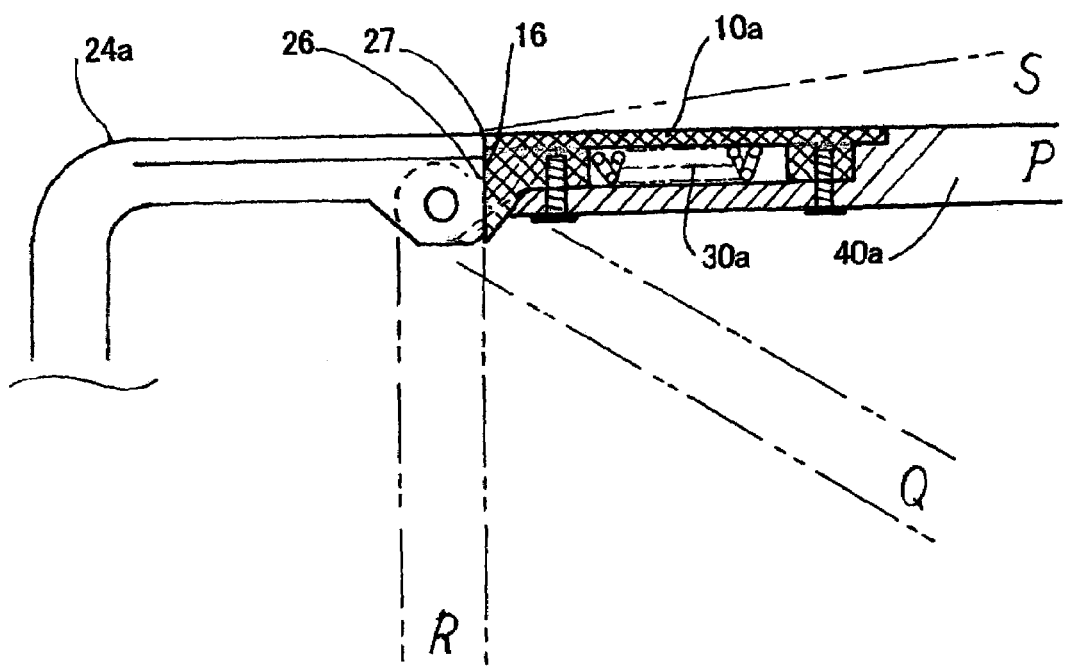
FIG. 6 is a plan view of the present invention assembled from the state shown in FIG. 5.

In FIG. 5, and FIG. 6, another embodiment of the invention comprises an attachment portion 24a, a temple 40a, a cover member 10a, a U-shape slide member 20a, a compression coil spring 30a, and other screw members. The attachment portion 24a has first hinge articulation elements 26 at the end thereon, at least a center element 27 of the first hinge articulation elements is formed into an angular shape, and the other elements 26a, 26b may be formed either into the angular shape or a round shape. The temple 40a includes a housing with a hollow portion having a front side opening 42a and an outside opening 43a to be connected to the attachment. The cover member 10a includes a cover board 17 and an essential front bump 11a and an optional rear bump 12a. The essential front bump 11a has a flat surface 16 which is perpendicular to the inner wall of the cover member. The flat surface of the front bump 16 is adapted to contact only to a back and side surfaces of the angular shaped center element 27 of the first hinge articulation elements 24a.

The U-shaped slide member 20a has second hinge articulation elements 21a at the free end, and substantial portion of the U-shaped slide member except the second hinge articulation elements is housed in the hollow portion 45a of the housing 43a, and is situated to slid along the longitudinally direction of the temple 40a. The compression coil spring 30a being preloaded is interposed between the front bump 11a of the cover member 10a and the inner periphery of the U-shaped member. The shaft screw is situated in both through holes of the first and second hinge articulation elements, so that the temple 40a is pivotally connected to the attachment 25. And the spring hinge is quickly assembled.

More preferably, the first hinge articulation elements are arranged to be spaced from a rotation range of distal end 42b of the temple so that the configuration prevents impairments due to the contact of the distal end of the temple.

In FIG. 6, when the assembled temple 40a is opened from a closed position (R), the temple 40a can be semi-automatically opened from a halfway opened position (Q) to a opened position (P) by a resilient reaction of the coil spring 30a, and when the temple 40a is closed from the opened position (P), the temple 40a can be semi-automatically closed from the halfway closed position (Q) to the closed position (R) by the resilient reaction of the coil spring. Also, the temple can be opened more outwardly from the wearing position (P) so that a user can easily wear the eyewear. The hinge assembly allows a compound movement between the temple and the front frame, the compound movement being so called "double action".

Figure 7:
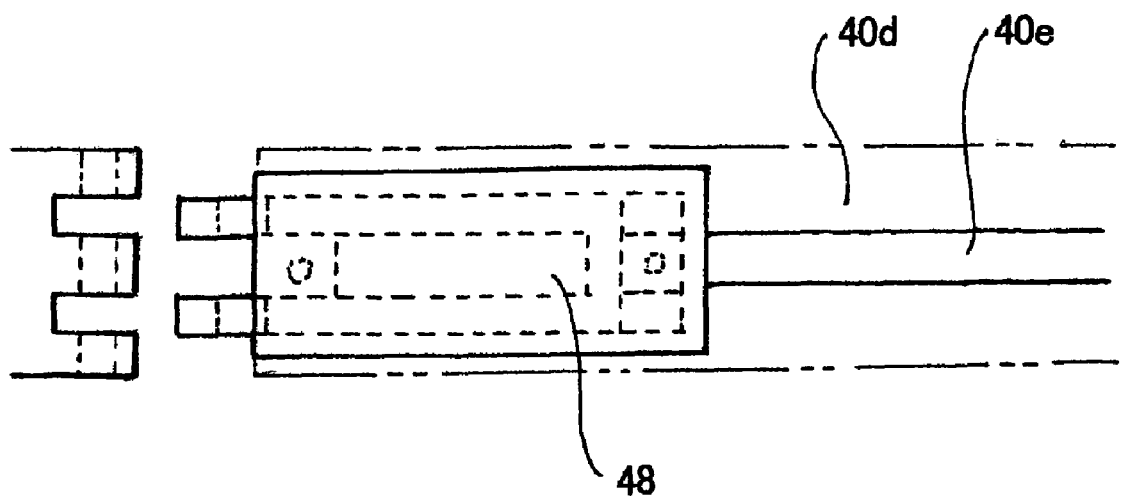
FIG. 7 is a side elevation view of the third embodiment of the present invention.

FIG. 7 is the third embodiment of the invention. A housing part 48 is provided, in which a front side face and an outside face of a hexahedral metal box are opened, and the remaining four faces form walls. The inner surfaces of the remaining four walls are formed in a flat shape, wherein only the bottom wall has through holes for fastening screws. A cover member integrally formed with one essential front bump and other optional rear bump having a screw hole, respectably, is fixed on the outside face of the hexahedral metal box by fastening screw. There is provided a metal core 40e extending rearward from rear surface of the rear wall of the hexahedral box, the metal core 40e is inserted into a resin or other soft material temple 40d, and the hexahedral metal box is inserted up to the front end of the temple and fixed.

Figure 8:
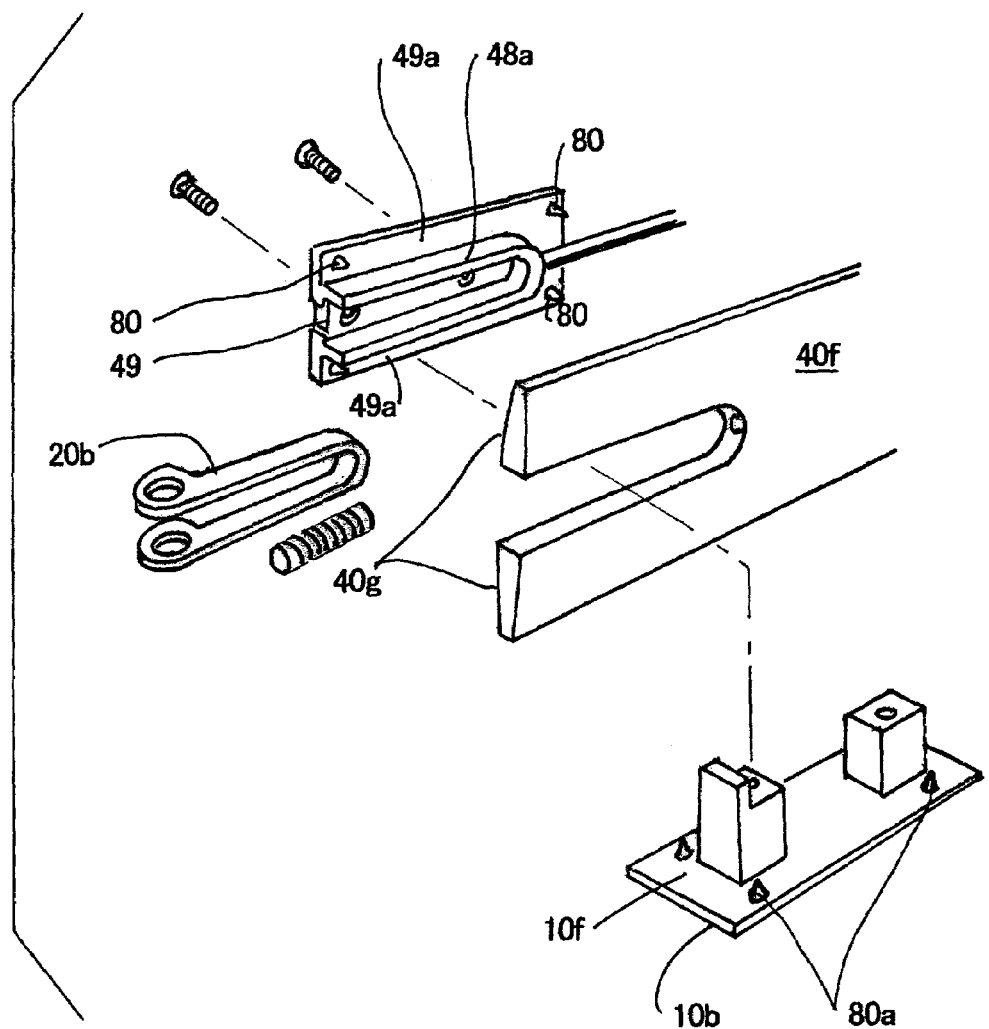
FIG. 8 is an exploded perspective view of the forth embodiment of the invention.

FIG. 8 is the fourth embodiment of the invention. There is provided an elongated wing or extension 48a extending from a bottom wall 49a of the hexahedral metal box 49, wherein the elongated wing or extension has at least a pair of projections 80 on its inner surface 49a. The projection 80 of the inner wall of the wing or extension is provided to contact a side surface 40g of a temple 40f made of resin or other soft material so that the hexahedral metal box is fixed tightly to the temple. Also, at least a pair of projections may be provided either on the inner wall 10f of the cover member 10b or on the inner wall of the wing or extension, or on the both wall.

Figure 9:
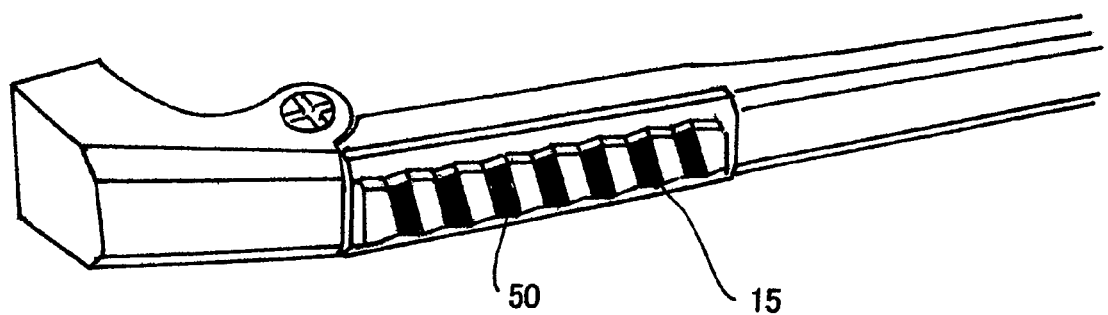
FIG. 9 is a perspective view of the decorative portion of the cover member of the fifth embodiment of the invention.

FIG. 9 is the fifth embodiment of the invention. There is provided an ornamental portion 50 on an outside surface of a cover member 15. The ornament may be formed by means of carving, pressing or machining, etc, and may be colored by proper means.

Figure 10:
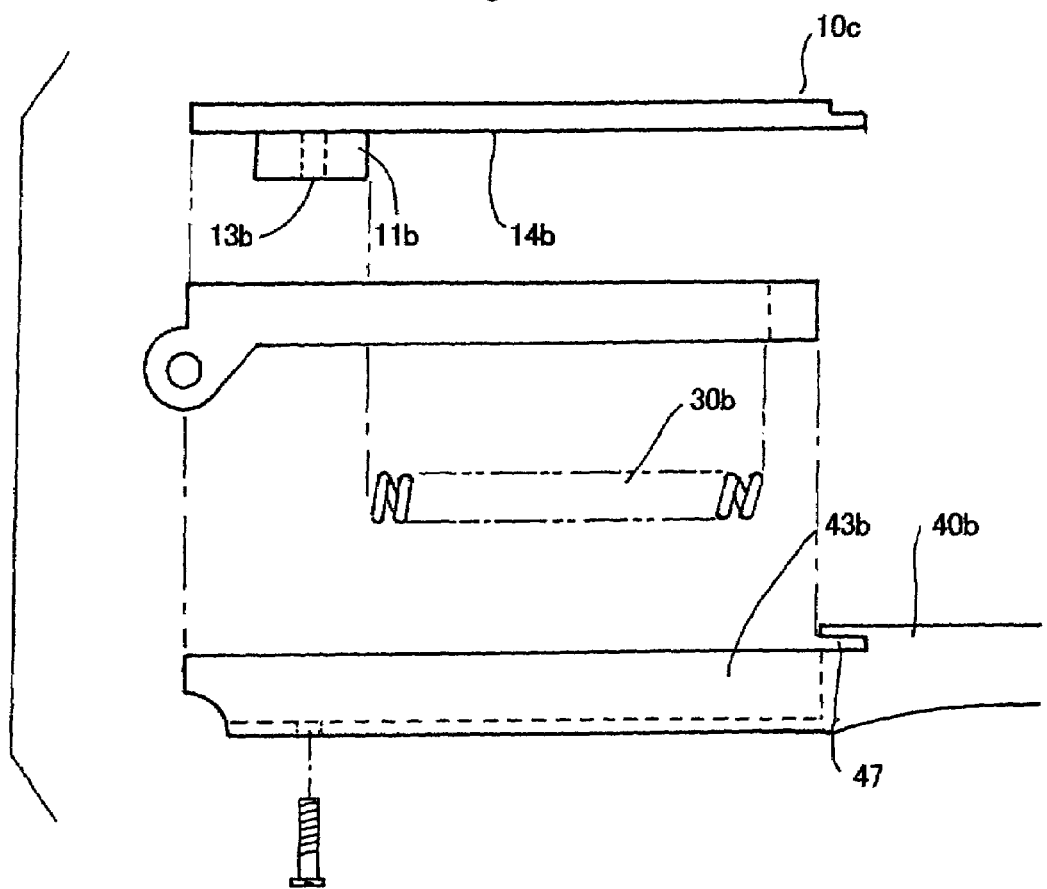
FIG. 10 is an exploded top plan view of the sixth embodiment of the invention.
Figure 11:
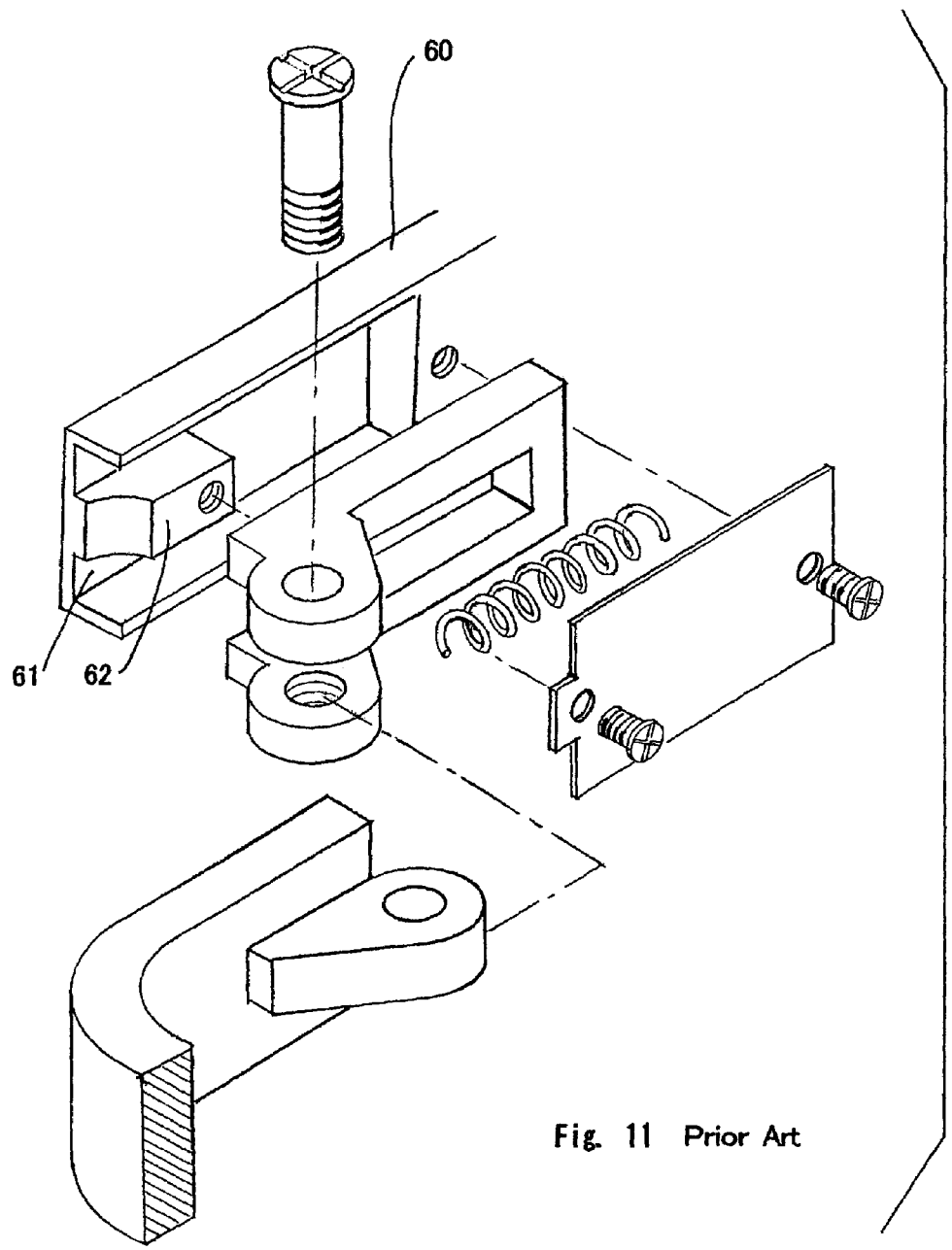
FIG. 11 is an exploded perspective view of the prior art.
Figure 12:
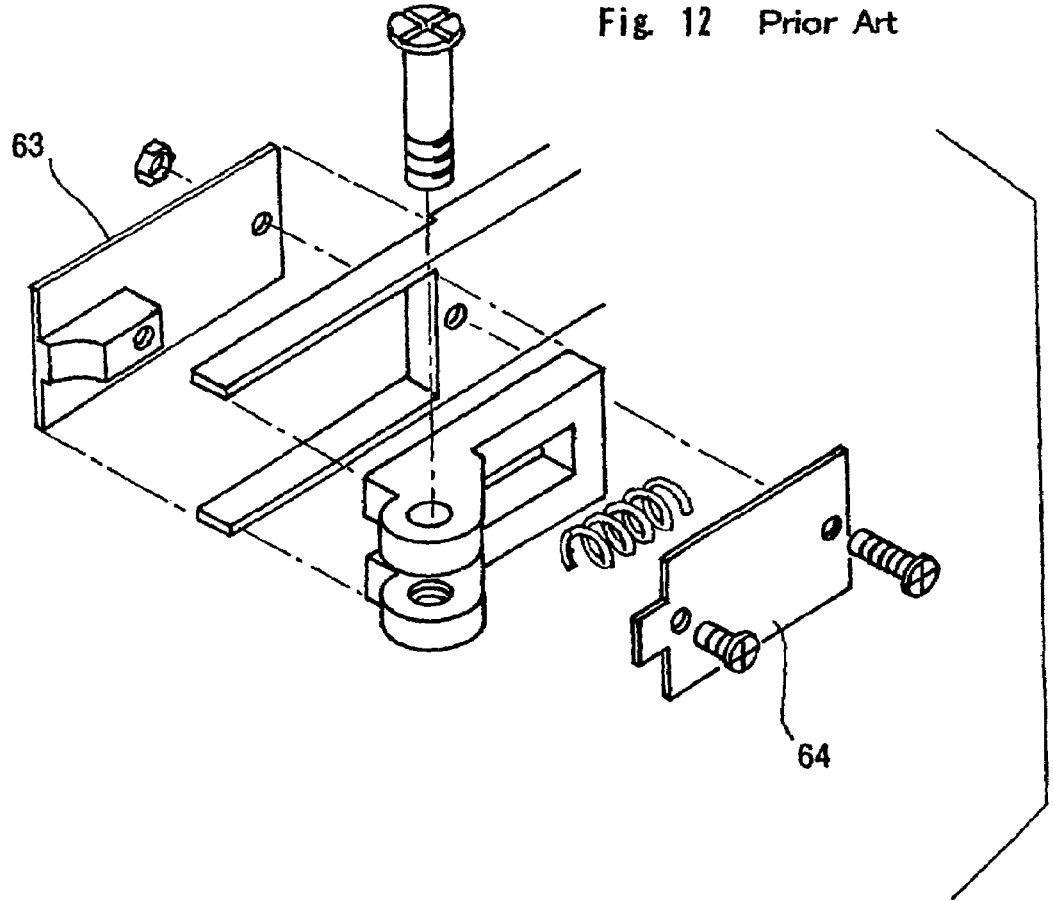
FIG. 12 is an exploded perspective view of the prior art.

FIG. 10 is the sixth embodiment of the invention. There is provided a notch 47 at an end of a housing 43a of the temple 40b or an end of rear wall of a hexahedral box instead of the rear bump of the cover member, and the cover member is fixed tightly without other bump and other fastening screw.

According to the invention illustrated above, by using the spring hinge structure of this invention, the ornament of the outside of the temple, formed at the outside surface of the cover member, can be easily formed and produced at a low cost, and design variation can be increased. Because of the first hinge articulation elements being spaced from the rotation range of the distal end of the temple, the surface and the shoulders of the first hinge articulation elements are prevented from impairments due to the contact to the distal end of the temple upon the rotation. Also, the cover member and the temple can be fixed tightly each other by fastening screw without warp, unsteadiness, and loose fitting. The spring hinge of this invention is useful to allow a wide and soft material temple, e.g. synthetic resin, wood, bamboo, or aluminum and the like, to be fixed therewith.

It is to be understood that the invention is not limited to the precise embodiments described above, and that minor modification may be made within the scope of the invention.

The disclosure of Japanese Patent Application No. 2007-173403, filed on Jun. 4, 2007, is incorporated in the application.

While the invention has been explained with reference to the specific embodiments of the invention, the explanation is illustrative and the invention is limited only by the appended claims.

What is claimed is:

1. A spring hinge for an eyewear, comprising:
    a front frame including an attachment portion provided at one end, and a first articulation hinge element formed adjacent to the attachment portion and having a hole;
    a temple to be connected to the front frame, said temple including a hollow housing provided at an end portion, a front side opening to face the attachment portion and an outside opening;
    a cover member for covering the outside opening, the cover member having a front bump integrally formed with the cover member and a screw hole provided in the one front bump to be connected to the temple;
    a U-shaped slide member having, at one end, a second articulation hinge element with a hole, said U-shaped slide member being housed in the hollow housing to be slidable along a longitudinal direction of the temple;
    a compression coil spring provided between the front bump and an inner periphery of the U-shaped member in a compressed state; and
    a shaft screw provided in the holes of the first and second articulation hinge elements to rotationally connect the temple and the attachment portion so that when the temple is pushed outwardly from the eyewear, the temple is opened outwardly from a position perpendicular to the front frame, while the compression coil spring is being compressed.

2. A spring hinge according to claim 1, wherein said cover member further comprises a rear bump provided away from the front bump and having a screw hole to be connected to the temple.

3. A spring hinge according to claim 1, wherein said cover member has an ornamental portion at an outside thereof.

4. A spring hinge according to claim 1, wherein said hollow housing includes a flat back portion integrally formed with the temple, said slide member being slidably held between the back portion and the cover member.

5. A spring hinge according to claim 4, further comprising a box having a bottom wall and an extension projecting from the bottom wall, said box being disposed in the hollow housing and attached to the temple to slidably receive the slide member therein.

6. A spring hinge according to claim 5, wherein said bottom wall extends laterally outwardly from the extension and has a plurality of projections engaging the temple.

7. A spring hinge according to claim 1, wherein said first articulation hinge element has an angular member with a back surface, and said front bump has a flat front surface to contact the back surface of the angular member so that when the temple is opened from a closed position, the temple is able to semi automatically open from a halfway opened position by a resilient reaction of the compression coil spring, and when the temple is closed from an open position, the temple is able to semi automatically close from a halfway closed position by a resilient reaction of the compression coil spring.

* * * * *